United States Patent [19]
Prat et al.

[11] Patent Number: 5,971,819
[45] Date of Patent: Oct. 26, 1999

[54] BONDING CONDUCTOR FOR ELECTRICAL CONNECTIONS BETWEEN MECHANICAL PARTS

[75] Inventors: Guy Roger Prat, Vitrolles; Jean Azeau, Gardanne; Serge Louis Roux, Marignane, all of France

[73] Assignee: Eurocopter, Marignane Cedex, France

[21] Appl. No.: 08/889,510

[22] Filed: Jul. 8, 1997

[30] Foreign Application Priority Data

Jul. 10, 1996 [FR] France .................................. 96 08602

[51] Int. Cl.⁶ ...................................................... H01R 4/02
[52] U.S. Cl. ............................................. 439/874; 439/883
[58] Field of Search ................................... 439/874, 883, 439/877, 879

[56] References Cited

U.S. PATENT DOCUMENTS 5,725,400  3/1998  Morikawa .................. 439/874

FOREIGN PATENT DOCUMENTS

| 1 544 703 | 7/1967 | France . |
| 2 679 074 | 7/1991 | France . |
| 39 35 017 | 4/1991 | Germany . |
| 261442 | 6/1925 | United Kingdom . |

Primary Examiner—Steven L. Stephan
Assistant Examiner—Javaid Nasri
Attorney, Agent, or Firm—Henderson & Sturm

[57] ABSTRACT

A bonding connector includes a metal cable (1) and end-pieces (2) surrounded by an assembly of conductive filaments (10) and includes a flexible protective cover (15). Each cable end includes an end piece (2). A portion of the assembly of conductive filaments (10) is housed and retained in the housing portion of a lug (6). The lug (6) includes an ear-piece (7). Electrical continuity between the assembly of conductive filaments (10) and each lug (6) is provided by soldering brazing within the housing of the lug (6). An internal cover (5) can be interposed between the cable (1) and the assembly of conductive filaments (10). A cladding sleeve (18) protects the mechanical and electrical connections provided in each lug (6).

14 Claims, 4 Drawing Sheets

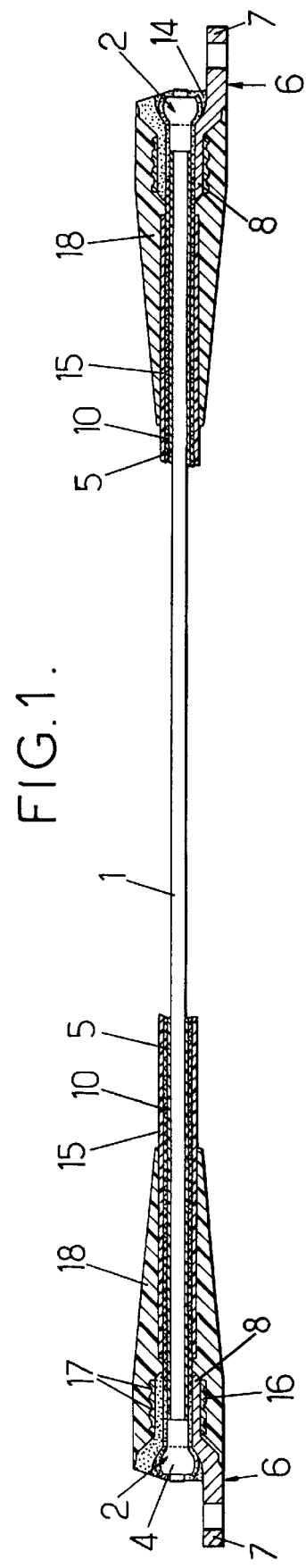

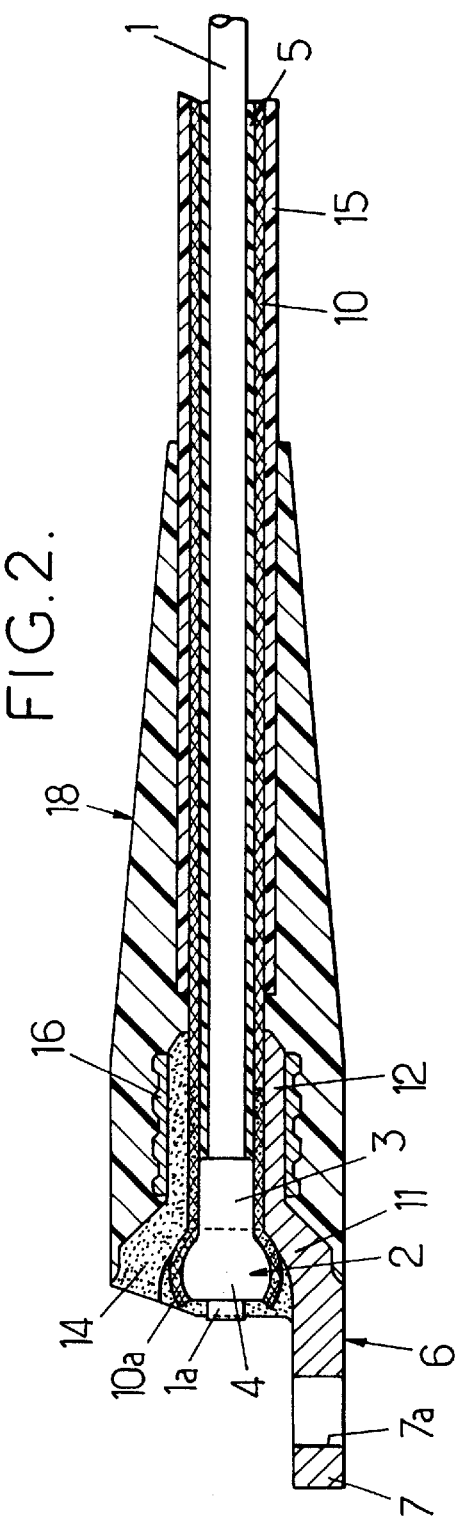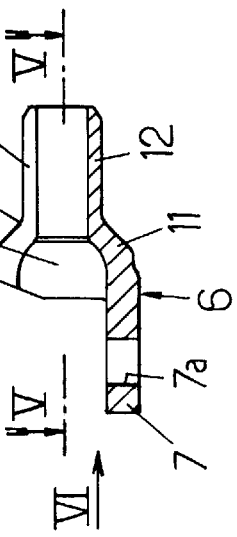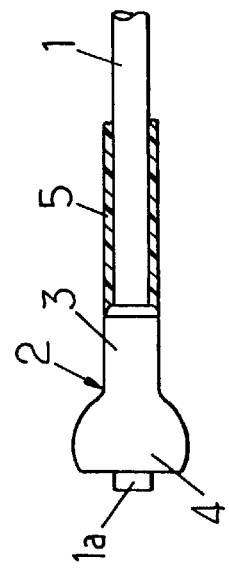

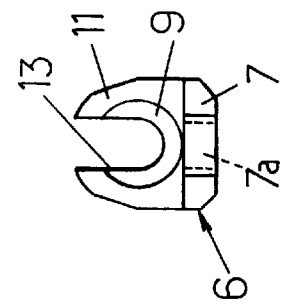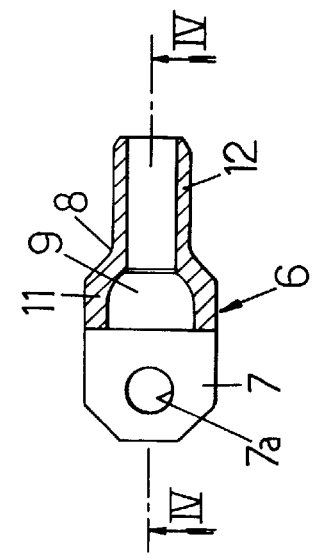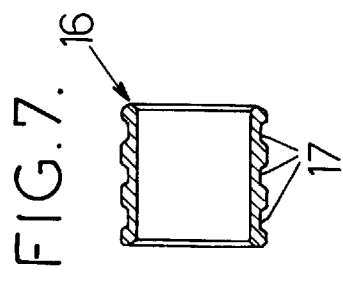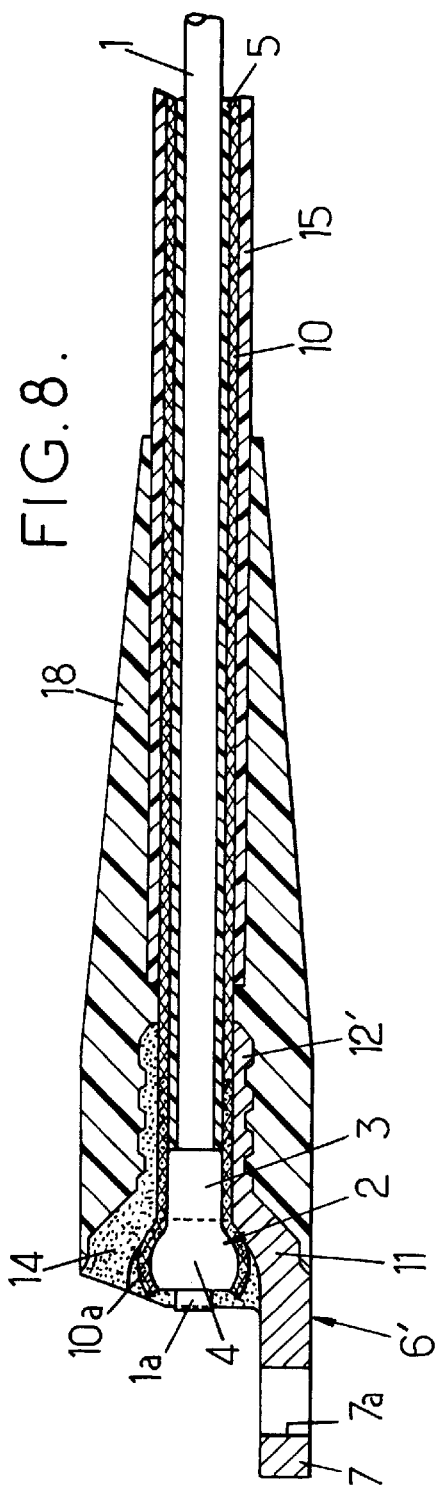

BONDING CONDUCTOR FOR ELECTRICAL CONNECTIONS BETWEEN MECHANICAL PARTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates to improvements to bonding conductors, for making connections providing electrical continuity between mechanical parts, particularly in the aeronautical field, and in particular for the purpose of improving the safety of aircraft in flight in stormy conditions.

2. Description of the Prior Art

In aeronautics, it is known to use conductors called "bonding" conductors in order to make, between mechanical parts connected to each other by articulations or links which totally or partially isolate them electrically, links or connections providing electrical continuity between those mechanical parts in order to guarantee their protection from attacks due to lightning currents or to accumulations of electrostatic charges.

Such bonding conductors are used for example between the various members of a rotor head of a rotary-wing aircraft in order to provide electrical continuity between its members and to carry, when the case arises, lightning currents from the impact zones, or the accumulated electrostatic charges, to an outlet point which is in electrical continuity with the structure of the rotary-wing aircraft. In particular, such a bonding conductor can connect each blade of a rotor with the hub of the rotor or, when each blade is connected to the hub by a connecting member, of the type called a bush because its central part is substantially tubular, which is itself connected to the hub by retaining and articulation means in particular comprising an electrically conductive strap attached to the hub, the bonding conductor can be attached, by one of its ends, to this strap, in electrical continuity with the hub and, by its other end, to the bush, in the vicinity of the means by which the corresponding blade is mounted, possibly in a pivoting manner, on this bush.

In these applications, a bonding conductor is subjected to large centrifugal tensile forces due to the rotation of the rotor, alternating flexion and torsional forces due to the alternating movements which it carries out in order to follow the angular deflections in pitch, flapping and drag of the blades with respect to the hub, and repellent forces of magnetic origin, resulting from antagonistic components of the current vector flowing through the bonding conductor when it forms a loop and when it is traversed by a lightning current, these repellent forces becoming greater as the intensity of the current increases and as the radius of curvature of the conductor becomes more pronounced.

In such applications, the use of bonding conductors consisting of a flexible steel cable core surrounded by a braid of electrically conductive wires which is itself covered by a synthetic protective cover, the ends of such conductors being crimped inside conductive connecting lugs, has proved to be unsatisfactory in particular because of the poor mechanical strength of the crimping of the cable surrounded by the braid inside the lugs, when subjected to the effect of the said forces due to centrifugal tension, flexion and torsion and repulsion.

In order to overcome this disadvantage, FR-A-2 679 074 proposes a bonding conductor in which the mechanical strength functions and the electrical functions are partially separated.

In order to constitute a flexible connection device intended to be attached such that each one of its two ends is attached to the respective one of two external elements, and to be subjected, on the one hand, to mechanical movements and stresses due to displacements, possibly relative ones, of the external elements and, on the other hand, to the passages of electrical currents and of electrostatic discharges between the external elements, the bonding conductor according to FR-A-2 679 074 is of the type comprising:

an electrically conductive flexible metal cable, each of whose two ends is attached to the respective one of two electrically conductive metal end-pieces, such that the cable and the end-pieces provide the essential part of the mechanical strength of the bonding conductor between its attachment ends and allow the possible passing of a portion of an electrical current or of an electrostatic discharge, two electrically conductive metal lugs of high mechanical strength, each one comprising, on the one hand, a part having a housing whose shape is adapted for receiving and retaining an end-piece and the corresponding end of the cable, in such a way as to ensure the transmission of longitudinal forces between the said lug and the said cable, and, on the other hand, a part for attachment to one of the external elements in order to provide simultaneously the mechanical continuity and the electrical continuity of the bonding conductor with the said external element, at least one assembly of electrically conductive filaments, around the said cable and in electrical continuity with the said lugs and providing the major portion of the electrical connection between the said lugs, and flexible means of protecting the conductive filaments.

In FR-A-2 679 074, the assembly of conductive filaments is arranged as a braid of metal filaments, and the flexible means of protection are an external protective cover disposed around the braid.

But, furthermore, in order to provide good mechanical strength and good electrical continuity to the connection between each lug, on the one hand, and, on the other hand, an end-piece, the corresponding end of the cable and the braid, the latter does not extend as far as covering the ends of the cable and the end-pieces crimped on these ends, and it is not engaged in the lugs, but, on the contrary, surrounds the housing portion of each lug, whilst itself being surrounded, at the level of this part, with a cylindrical metal ring, which is itself covered by the external protective cover which is disposed around the braid. At each end of the flexible cable, the assembly of this end, the corresponding end-piece, the corresponding lug, the conductive braid and the corresponding ring is joined together by crimping the ring around the braid and the housing part of the lug, or, as a variant, by soldering or brazing using an added metal in the melted state, for example tin, which is poured into the housing part of the lug and around the latter, into the ring and into the portion of the braid disposed inside the ring between the latter and the lug, such that the added metal provides the connection between the previously mentioned various elements of this assembly.

In use it has proved that such a construction does not have sufficient reliability. This disadvantage is related in particular to the possible slipping of the protective external cover with respect to the lugs, to the fatigue fracture of the conductive braid at the level of the junction between the flexible cable and the end of the housing part of the lugs, to the degradation of the flexible metal cable where it emerges from each lug and to the degradation of the conductive braid during the operation of crimping the ring, when the mechanical and electrical connections between the braid and each lug are provided by crimping the corresponding ring.

In general, the disadvantages of this known construction arise because the stresses due to functioning (under the effect of flexion and/or torsional forces, centrifugal forces in flight and repellent forces of magnetic origin in the case of lightning strike), and the stresses due to the crimping, where applicable, are concentrated in the same section of the bonding conductor.

BRIEF SUMMARY OF THE INVENTION

By means of the present invention, it is proposed to overcome this disadvantage and avoid fatigue fractures and degradations of the braid both in service and during manufacture of the bonding conductor, and to avoid degradations of the flexible metal cable where it emerges from the lugs and degradation of the external protection of the lugs.

Another purpose of the invention is to propose improvements to the bonding conductor known from FR-A-2 679 074, in order to provide better distribution within the conductor's structure of the operational stresses and of the possible stresses introduced during the manufacturing of the conductor.

For this purpose, the invention proposes a bonding conductor of the type known from FR-A-2 679 074, and such as described above, and wherein the assembly of filaments extends around the end-pieces and the ends of the cable attached to the end-pieces, and the assembly of filaments penetrates inside the said housing parts of the said lugs, the electrical continuity of the assembly of filaments with the lugs being provided by soldering or brazing by the addition of metal in the said housings and providing the connection between each lug and the end-piece, the end of the cable and the part of the assembly of filaments which are housed in the said housing of the said lug.

Thus, the assembly of conductive filaments is no longer crimped or soldered to the outside of each lug, between the latter and a corresponding ring, but, on the contrary this assembly of filaments surrounds each end-piece and the corresponding end of the cable and penetrates inside each lug, and electrical continuity is provided by the added metal, for example tin, inside the lug only, and such that the assembly of filaments remains flexible where it emerges from each lug. The electrical contact between the assembly of filaments and each lug is thus formed by a soldering or a brazing, for example using tin, which is limited to the housing part of the lug.

As in FR-A-2 679 074, the assembly of conductive filaments can be arranged as at least one braid of metal filaments, the flexible means of protection can consist of an external protective cover disposed around the assembly of filaments, and the cable can have each of its ends engaged and retained, for example by crimping, inside a tubular section of the corresponding end-piece. In this case, it is furthermore advantageous for the cable to be surrounded, in its section extending between the two end-pieces, by an internal cover extending between the cable and the assembly of filaments, in order to eliminate the discontinuity of cross-section between the cable and each end-piece in order to avoid damaging the assembly of conductive filaments from the inside.

But it is also possible for the flexible means of protection, made from at least one electrically insulating material, which is synthetic or natural rubber-based, to comprise, in addition to the external cover or in place of the latter, a flexible binder providing an individual cladding of the conductive filaments.

The protection, provided by the said flexible means over the major part of the length of the bonding conductor, is completed, near its ends, by the fact that the housing part of each lug, the end-piece, the corresponding end of the cable and the part of the assembly of filaments retained in the said housing part by the added metal, and the parts of cable, of the assembly of filaments and, possibly, of external cover which are adjacent to the said lug are surrounded by an electrically insulating cladding sleeve. Advantageously, in order to create variable stiffness, adapted to the deformations which the bonding conductor can undergo without risk of damaging the protection provided by the cladding sleeves, the thickness of each sleeve progressively decreases from the said corresponding lug towards the centre of the said bonding conductor, at least in the part of the said sleeve which surrounds the said adjacent parts of the cable, the assembly of filaments and, possibly, of the external cover.

In order to produce waterproof protection, each cladding sleeve can be overmoulded around a corresponding lug and the said corresponding adjacent parts of the cable, of the assembly of filaments and, possibly, of the external cover, in which case it is advantageous for the sleeve to adhere to the lug and/or for it to be anchored with respect to the lug by engagement in grooves around the housing part of that lug.

In a first embodiment, the anchoring grooves are formed directly in the outer surface of the housing part of the corresponding lug.

But, according to a second embodiment, it is also possible for the anchoring grooves to be formed in the outer surface of a ring hooped or crimped around the housing part of this lug. In this embodiment, the lug is hooped by the grooved ring in such a way as to provide resistance to the longitudinal or axial tension compatible with the repellent forces encountered during a lightning strike.

Advantageously, furthermore, the flexible means of protection extend up to a short distance from the lugs and are made of a transparent material and each cladding sleeve is made of a transparent synthetic material, such as polyurethane, so that the behaviour of the conductive filaments of the assembly where it emerges from the lugs can be observed because of the transparency.

In a way similar to the structure described in FR-A-2 679 074, each lug advantageously has a radial groove, whose width is slightly greater than the diameter of the said metal cable coated with the assembly of filaments and, if applicable, the internal cover, in order to make it possible to insert transversely the corresponding end of the said cable, provided with its end-piece and surrounded by the assembly of filaments, into the housing of the said lug.

Similarly, the housing part of each lug has, on the attachment part end of the said lug, a cradle substantially shaped like a spherical cap and prolonged, towards the centre of the conductor, by a substantially cylindrical and tubular portion for the passage of the cable, the internal cover if applicable and the assembly of filaments and a cylindrical portion of the corresponding end-piece, which has a bulging section substantially in the shape of a spherical cap, forming a ball, surrounded by a corresponding end of the assembly of filaments and retained with the latter in the said cradle.

BRIEF DESCRIPTION OF THE SEVERAL VIEWS OF THE DRAWINGS

Other advantages and characteristics of the invention will emerge from the description given below, in a non-limitative way, of example embodiments described with reference to the accompanying drawings in which:

FIG. 1 is a diagrammatic assembly drawing of a bonding conductor, shown in longitudinal cross-section limited to its two ends, FIG. 2 is a cross-sectional view, at a bigger scale, of an end of the conductor shown in FIG. 1, FIG. 3 is a side elevation view of an end-piece attached to an end of the central cable of the conductor shown in FIGS. 1 and 2, FIGS. 4 and 5 are cross-sectional views of a lug of the conductor, FIG. 4 being a cross-section along IV—IV of FIG. 5, and FIG. 5 being a cross-section along V—V of FIG. 4, FIG. 6 is an end view in the direction of the arrow VI of FIG. 4, FIG. 7 is a longitudinal or axial cross-sectional view of an anchoring ring of the conductor shown in FIGS. 1 and 2, FIG. 8 is a view similar to FIG. 2 for a second embodiment of the bonding conductor.

DETAILED DESCRIPTION OF THE INVENTION

Figure 9:
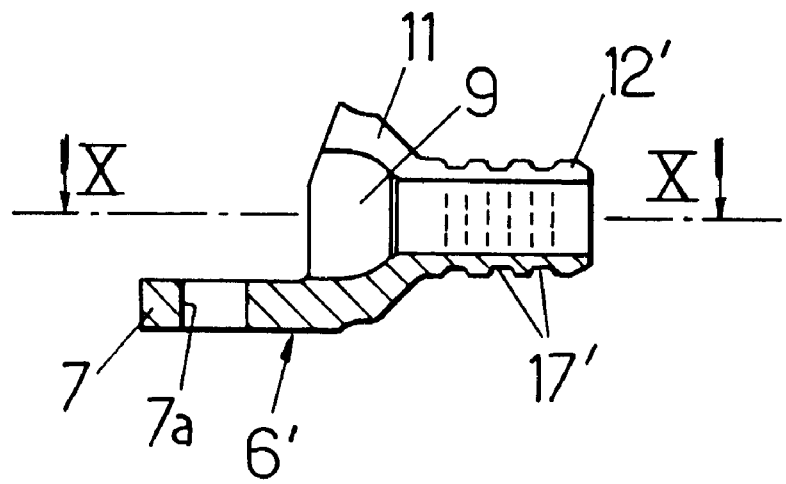
FIGS. 9 and 10 are cross-sectional views similar to FIGS. 4 and 5 for the second embodiment of the conductor shown in FIG. 8, FIG. 9 being a cross-section along IX—IX of FIG. 10, which is itself a cross-section along X—X of FIG. 9.

As in FR-A-2 679 074, the bonding conductor shown in FIGS. 1 and 2 comprises a central core which is strong, deformable and electrically conductive, consisting of a flexible metal cable 1, formed of pre-formed wires and strands, made of high-strength steel, for providing the conductor's resistance to tension. Each end 1a of the cable 1 is engaged and retained directly by crimping inside a tubular cylindrical portion 3 of an end-piece 2, also made of high strength electrically conductive steel, and on which the cylindrical portion 3 ends, at the end opposite to that of the cable 1, in a bulging part shaped substantially like a spherical cap protruding radially outwards in order to constitute a ball 4, as shown in FIG. 3 and described with reference to FIGS. 3A and 3B of the French patent mentioned above.

But, prior to the attachment by crimping of the end-pieces 2 to the ends of the cable 1, the cable 1 is covered, over its entire length between its end sections received in the end-pieces 2, with an internal protective cover 5. This cover 5 is for example moulded or simply slipped over the cable 1, and the cover 5 can be electrically insulating and made of polyurethane. The thickness of the cover 5 is chosen such that it compensates for the difference in diameter between the cable 1 and the cylindrical portion 3 of the end-pieces 2, as shown in FIGS. 1, 2 and 3. The elimination of the discontinuity in diameter between the cable 1 and the cylindrical portions 3 because of the cover 5 makes it possible not only to protect the cable 1 which this cover 5 surrounds, but also to protect from the inside the assembly of electrically conductive filaments 10, which is then disposed around the cable 1, the cover 5 and the end-pieces 2.

In particular, the cover 5 prevents the deterioration of the assembly of filaments 10 in contact with the end of the cylindrical portion 3 of each end-piece 2, at the end nearest the centre of the cable 1.

The assembly of filaments 10 can be made from tinned copper wires in the form of a single tubular braid of relatively large cross-section or from several, for example two, tubular braids slipped one inside the other and therefore superimposed, and this filaments element 10 is slipped over the cable 1 covered with the internal cover 5 and having its end-pieces 2 in such a way as to cover the end-pieces 2.

In all cases, the orientation of the filaments 10 is determined in such a way as to minimise the stresses applied to them during deformations related to the relative displacements of the mechanical parts during their functioning.

The assembly consisting of the cable 1, the end-pieces 2, the internal cover 5 and the conductive filaments 10 is then surrounded with an external protective cover 15 made of a flexible, electrically insulating and synthetic or natural rubber-based material which extends over the whole central part of this assembly and stops at a certain distance from the end-pieces 2 for a reason mentioned below. This external cover 15 is, for example, made in the form of a braid of synthetic heat-shrinkable material, retaining all of its flexibility at low-temperature and electrically insulating, such as the material marketed under the trade name VITON. This cover 5 is slipped over the said assembly, and then shrunk by heating over the part of the conductive filaments which it covers. The flexible protection of the conductive filaments 10 can be provided, in addition to the external cover 15 or in place of the latter, by a flexible and electrically insulating binder made of synthetic or natural rubber-based material, which provides an individual cladding of the filaments, in such a way as to constitute a composite material with conducting filaments and a flexible binder.

Then, two rings 16, made of copper or steel for example, of generally cylindrical shape and of internal diameter distinctly greater than the external diameter of the braid of filaments 10, are slipped around the assembly thus constituted and placed in readiness in the central section of this assembly, each ring 16 being such as shown in cross-section in FIG. 7, with three annular grooves 17 formed in its outer surface, each groove 17 being rounded at the connections between its bottom and its side walls. The function of this ring 16, grooved at 17, is described below.

Each of the two ends of the conductor assembly thus formed is then positioned in one of two mechanical and electrical connection lugs 6, such as shown in FIGS. 4 to 6. Each lug 6 is made of beryllium bronze and is machined out of the solid in order to provide it with good mechanical strength and good electrical conductivity. Each lug 6 has a part for the mechanical attachment and electrical connection with one of the two elements between which the bonding conductor is intended to provide electrical continuity. This attachment part is in the form of a flat ear-piece 7 of substantially polygonal shape, pierced at its centre with a bore 7a, possibly tapped, for attachment of the ear-piece 7 by screwing or bolting onto one of the two elements to be connected. Each lug 6 also has an elongated part 8 which delimits a housing 9 intended to receive an end-piece 2, the end of the cable 1a crimped in this end-piece 2, and the end part 10a of the assembly of filaments 10 which surrounds this end-piece 2. The part 8 with a housing 9 more precisely consists, at the end nearest the ear-piece 7, of a funnel-shaped section widening towards the ear-piece 7 and forming a cradle 11 shaped like a substantially spherical cap and which is extended, at the opposite end, by a substantially cylindrical and tubular section 12. The cradle 11 and the tubular section 12 of the part 8 have a radial groove 13 (see FIG. 6) which extends over the whole of the axial length of the upper zone of the part 8 and has a width slightly greater than the diameter of the cable 1 covered with the internal cover 5 and the assembly of filaments 10, to allow the transverse insertion of an end portion of the cable 1, fitted with its end-piece 2 and surrounded with the cover 5 and the assembly of filaments 10, into the housing 9 of the lug 6. The ball 4 of the end-piece 2 is then lodged, by means of a slight axial or longitudinal displacement, in the cradle 11, the cylindrical portion 3 of the end-piece 2 and the parts which are adjacent to it on the cable 1, the internal cover 5 and the assembly of filaments 10 axially traversing the cylindrical portion 12 of the lug 6. On the other hand, the external cover 15 is not engaged in the part 8 of the lug 6 and stops at a slight distance from the end of the cylindrical portion 12 nearest the centre of the cable 1.

By means of a movement of translation, the two rings 16, which are in a state of readiness around the conductor, are displaced in order to bring each of them around the cylindrical portion 12 of one of the lugs 6, and it is fixed around this cylindrical portion 12, for example by crimping or by hooping, in the position shown in FIGS. 1 and 2. Each ring 16 is fixed around the cylindrical portion 12 of a lug 6 in such a way as to ensure resistance to axial tension compatible with the repellent forces of magnetic origin which can be encountered when lightning current is flowing.

The electrical continuity and the mechanical connection between the assembly of filaments 10 and each lug 6 are then produced by soldering or by brazing with the addition of a molten conductive metal, such as tin, into the part 8 with a housing 9 of each lug 6, and into the radial groove 13 of this part 8. The filling with added metal is illustrated at 14 in FIG. 2. The added metal fills the housing 9 around the end-piece 2, the corresponding end part of the cable 1 and the adjacent end part of the internal cover 5, and the added metal also penetrates also penetrates between the filaments of the corresponding end part 10a of the assembly of filaments 10, the addition of molten metal, limited to the inside of the part 8 of each lug 6, also providing the connection between this lug 6, on the one hand, and, on the other hand, the end-piece 2, the end 1a of the cable 1 and the part 10a of the assembly of filaments 10 which are housed in the housing 9 of this part 8. It can be seen that the ring 16 fixed around the cylindrical portion 12 participates in the confinement of the added metal 14 in the portion 8 of the lug 6.

Thus, the cable 1 and the end-pieces 2 essentially provide the mechanical strength of the bonding conductor, and the retention of the end-pieces 2 in the cradles 11 of the lugs 6 ensures the transmission of longitudinal forces between the cable 1 and the lugs 6. Simultaneously, the cable 1 and the end-pieces 2, in electrical continuity with the lugs 6, allow the possible passage of a portion of a lightning current of high intensity or of a large electrostatic discharge. But the main electrical connection is provided by the assembly of filaments 10 in electrical continuity with the lugs 6 due to the tinning 14.

The electrical and mechanical connections thus provided at the level of each lug 6 are protected by a cladding sleeve 18 made, for example, of transparent polyurethane. Each sleeve 18 comprises a substantially cylindrical part which surrounds the part 8 and the lug 6 and the corresponding ring 16, whose grooves 17 in its external surface serve as anchoring grooves for the material constituting the sleeve 18 which also adheres to the lug 6. This cylindrical section of the sleeve 18 thus also surrounds all of the elements contained in the part 8 with a housing 9 of the lug 6, and it is extended towards the centre of the cable 1 by a part which is substantially shaped like a truncated cone, whose thickness diminishes progressively and which covers the corresponding end part of the external cover 15. The production of the sleeve 18, of the external cover 15 and/or, if applicable, the cladding binder of the filaments 10 from an electrically insulating and transparent material allows the visual inspection of the state of the conductive filaments 10 where they emerge from the cylindrical portion 12 of the lug 6, and makes it possible to check for possible damage of the conductive filaments 10.

Each sleeve 18 can be overmoulded around the part 8 of the corresponding lug 6 and around the adjacent parts of the cable 1, of the internal cover 5, of the assembly of filaments 10 and of the external cover 15 when it is present. During the overmoulding, the grooves 17 of the ring 16 provide a good key for the cladding around the part 8 of the lug 6, to which the material of the sleeve 18 adheres. The progressively decreasing thickness of the sleeve 18 towards the centre of the cable 1 makes it possible to provide the conductor thus produced with a stiffness which increases progressively towards its corresponding end. The cladding of the ends with a transparent polyurethane having a Shore harness of 80 can be carried out in a mould in which the assembly constituted by the conductor and its two lugs 6 are positioned such that a sleeve 18 is formed at each end. This sleeve 18 makes it possible to ensure a regular deformation of the assembly of filaments 10 in service and protects the latter from mechanical attacks and from corrosion. Each sleeve 18 provides a waterproof cladding of the elements which it surrounds and adheres perfectly to the corresponding end-piece 2 by the intermediary of the lug 6 and of the filling metal 14 in order to transmit the deformations to the assembly of filaments 10 by the intermediary of this sleeve 18. The latter withstands permanent exposure to bad weather, ozone and ultra-violet radiation, and to pollution by the projection of cleaning products (detergents or solvents), of de-icing or anti-freeze products based on ethylene glycol and by the projection of oils.

The mechanical characteristics and the geometry of the sleeves 18 make it possible to minimise the mechanical stresses in the conductive filaments 10 and in the cable 1, particularly in the attachment zones.

The optimising of the chemical nature and mechanical characteristics of the external cover 15 and/or of the cladding binder of the filaments 10 and of the sleeves 18 makes it possible to optimise:

the resistance to stress-inducing conditions, deformations, frequencies and the dynamic fatigue strength in the operational temperature range, the strength and protection of the filaments 10 with respect to attacks related to the application, in particular, of oxygen, ozone, humidity, polluting substances (petroleum products, anti-freeze or de-icing products, exhaust gasses, chemical weapons, etc . . . ).

This protection is reinforced by the waterproof assembly which is strong with respect to mechanical stresses and to attacks from the environment of the assembly, comprising the attachment end-pieces, the sleeves 18 and the external cover 15 and/or the protective binder of the filaments 10.

In the bonding conductor thus produced, it should be noted that the braid 10 remains flexible where it emerges from the lugs 6.

The second embodiment shown in FIG. 8 essentially differs from the one described above only in the fact that the grooves 17' for anchoring the constituent material of the cladding sleeve 18 are directly formed in the outer surface of the cylindrical portion 12' of each lug 6', which is otherwise identical to the lug 6 in the preceding embodiment and to which the material of the sleeve 18 can adhere.

In this second embodiment, it is therefore of no use to provide a grooved hooping or crimping ring, such as the ring 16 shown in FIG. 7, because the anchoring of the sleeve 18 is carried out directly around the lug 6'.

In other respects, this second embodiment is identical to the first one such that equivalent elements are indicated by the same numerical references.

Figure 10:
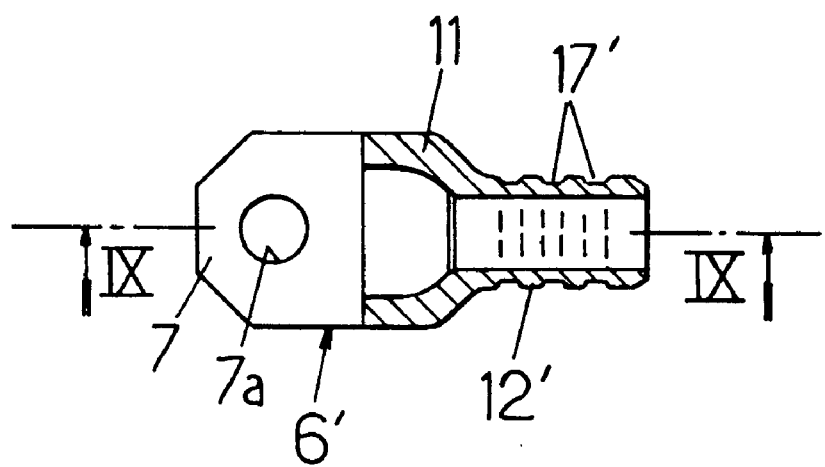

In FIGS. 9 and 10, the reference 17' indicates the annular grooves formed directly in the external periphery of the tubular cylindrical portion 12' of each lug 6'.

This second embodiment procures the same advantages as the first one in comparison with the products which were the subject of FR-A-2 679 074.

What is claimed is:

1. Bonding conductor having two attachment ends, in order to constitute a flexible connection device intended to be attached such that each one of said two ends is attached to a respective one of two external elements, and to be subjected, on the one hand, to mechanical movements and stresses due to displacements, possibly relative ones, of said external elements and, on the other hand, to passages of electrical currents and of electrostatic discharges between said external elements, and of the type comprising:

an electrically conductive flexible metal cable, having two ends each of which is attached to a respective one of two electrically conductive metal end-pieces, such that said cable and said end-pieces provide an essential part of the mechanical strength of the bonding conductor between said attachment ends and allow the possible passing of a portion of an electrical current or of an electrostatic discharge, two electrically conductive metal lugs of high mechanical strength, each one comprising, on the one hand, a part having a housing whose shape is adapted for receiving and retaining one of said end-pieces and said corresponding end of said cable, in such a way as to ensure the transmission of longitudinal forces between said lug and said cable, and, on the other hand, a part for attachment to one of said external elements in order to provide simultaneously the mechanical continuity and the electrical continuity of the bonding conductor with said external element, at least one assembly of electrically conductive filaments, around said cable and in electrical continuity with said lugs and providing a major portion of the electrical connection between said lugs, and flexible means of protecting said conductive filaments, wherein said assembly of filaments extends around said end-pieces and said ends of said cable attached to said end-pieces, and said assembly of filaments penetrates inside said housing parts of said lugs, the electrical continuity of said assembly of filaments with said lugs being provided by soldering or brazing by the addition of metal in said housings and providing the connection between each of said lugs and said end-piece, said end of said cable and said part of said assembly of filaments which are housed in said housing of said lug.

2. Bonding conductor according to claim 1, wherein said flexible means of protection consist of an external protective cover disposed around said assembly of conductive filaments.

3. Bonding conductor according to claim 1, wherein said flexible means of protection comprise a flexible binder providing an individual cladding of said conductive filaments of said assembly.

4. Bonding conductor according to claim 1, wherein said flexible means of protection is made from at least one electrically insulating material, which is synthetic or natural rubber-based.

5. Bonding conductor according to claim 1, wherein said assembly of conductive filaments is arranged as at least one braid of metal filaments.

6. Bonding conductor according to claim 1, wherein said cable has each of said ends engaged and retained inside a tubular section of the corresponding end-piece, and in that said cable is surrounded, in its section extending between said two end-pieces, by an internal cover extending between said cable and said assembly of filaments, in order to eliminate a discontinuity of cross-section between said cable and each of said end-pieces.

7. Bonding conductor according to claim 1, wherein said housing part of each lug has, on the attachment part end of said lug, a cradle substantially shaped like a spherical cap and prolonged, towards the centre of the conductor, by a substantially cylindrical and tubular portion for the passage of said cable and said assembly of filaments and a cylindrical portion of said corresponding end-piece, which has a bulging section substantially in the shape of a spherical cap, forming a ball, surrounded by a corresponding end of said assembly of filaments and retained with said assembly in said cradle.

8. Bonding conductor according to any claim 1, wherein said housing part of each lug has a radial groove, whose width is slightly greater than the diameter of said metal cable coated with said assembly of filaments in order to make it possible to insert transversely the corresponding end of said cable, provided with said end-piece and surrounded by said assembly of filaments, into said housing of said lug.

9. Bonding conductor according to claim 1, wherein aid housing part of each lug, said end-piece, said corresponding end of said cable and said part of said assembly of filaments retained in said housing part by said added metal, and said parts of cable, of said assembly of filaments which are adjacent to said lug are surrounded by an electrically insulating cladding sleeve.

10. Bonding conductor according to claim 9, wherein the thickness of each cladding sleeve progressively decreases from said lug towards the centre of said bonding conductor, at least in a part of said sleeve which surrounds said adjacent parts of said cable and said assembly of filaments.

11. Bonding conductor according to claim 9, wherein said flexible means of protection extend up to a short distance from said lugs and are made of a transparent material and each cladding sleeve is made of a transparent synthetic material, such as polyurethane, so that the behaviour of said conductive filaments of said assembly where it emerges from said lugs can be observed because of the transparency.

12. Bonding conductor according to claim 9, wherein said cladding sleeve is overmoulded around said lug and said corresponding adjacent parts of said cable, of said assembly of filaments said sleeve adhering to said lug and being anchored with respect to said lug by engagement in grooves around said housing part of said lug.

13. Bonding conductor according to claim 12, wherein said anchoring grooves are formed directly in an outer surface of said housing part of said lug.

14. Bonding conductor according to claim 12, wherein said anchoring grooves are formed in a ring hooped or crimped around said housing part of said lug.

* * * * *